United States Patent [19]
Sato

[11] 4,456,352
[45] Jun. 26, 1984

[54] LIGHT RECEIVING APPARATUS FOR USE IN SINGLE-LENS REFLEX CAMERA

[75] Inventor: Yasuhisa Sato, Yokohama, Japan

[73] Assignee: Canon Kabushiki Kaisha, Tokyo, Japan

[21] Appl. No.: 351,935

[22] Filed: Feb. 24, 1982

[30] Foreign Application Priority Data

Mar. 6, 1981 [JP] Japan ................................. 56-32112

[51] Int. Cl.³ .............................................. G03B 7/08
[52] U.S. Cl. .................................... 354/429; 354/479
[58] Field of Search ................ 354/23 R, 31 R, 31 F, 354/59

[56] References Cited

U.S. PATENT DOCUMENTS

| | | | |
|---|---|---|---|
| 3,691,922 | 9/1972 | Konig et al. | 95/44 |
| 4,095,241 | 6/1978 | Matsumoto | 354/31 R |
| 4,189,218 | 2/1980 | Saito et al. | 354/31 F |
| 4,389,107 | 6/1983 | Lenk et al. | 354/59 |

*Primary Examiner*—Russell E. Adams
*Attorney, Agent, or Firm*—Fitzpatrick, Cella, Harper & Scinto

[57] ABSTRACT

A light receiving apparatus for use in single-lens reflex camera is disclosed. A beam splitter is disposed between the swing-up mirror of the camera and the film plane to divide the light transmitted through the taking lens into a plural number of beams. To receive the divided beams there are provided a plural number of photoreceptors in the respective optical paths of the divided beams.

3 Claims, 4 Drawing Figures

LIGHT RECEIVING APPARATUS FOR USE IN SINGLE-LENS REFLEX CAMERA

BACKGROUND OF THE INVENTION

1. Field of the Invention

The present invention relates to a light receiving apparatus for use in single-lens reflex camera of the type in which the beam of light transmitted through a taking lens is divided into a plural number of beams running in different directions and the respective divided beams are received by photoreceptors.

2. Description of Prior Art

In the art there have been proposed various types of photo-metering apparatus which measures the reflected light from the film plane and with which TTL flash output control also can be attained.

For example, Japanese Patent Application laid-open No. Sho-50-82,399 disclosed such an apparatus in which a portion of the rotary reflecting mirror for a view-finder is formed as half-mirror and a sub-mirror is disposed behind it to divide the object beam into beams which are guided to selected positions respectively. Also, in Japanese Utility Patent Application laid-open No. Sho-53-148,637 there is disclosed such a photo-metering apparatus in which a sub-reflecting mirror having a directional reflecting surface is disposed behind the rotary reflecting mirror for a view-finder to split the object beam and to correct the distribution of sensibility in light measuring.

However, these known beam splitting systems have a particular disadvantage. In all of the known apparatus as mentioned above, the beam is directed in only one direction. Therefore, it is difficult to use the beam for many different purposes such as measurement and automatic focusing at the same time.

SUMMARY OF THE INVENTION

Accordingly, it is an object of the present invention to provide a light receiving apparatus with which the object beam can be divided into a plural number of beams each running in different directions and therefore the divided beams can be used for different purposes respectively.

To attain the above object according to the invention, a beam splitting member is disposed behind the rotary mirror for a view-finder of a single-lens reflex camera to divide the beam of light coming from the object into beams directed in different directions. A plural number of photoreceptors are arranged in the different directions in which the divided beams run respectively to receive the beams and use them for different purposes.

Other and further objects, features and advantages of the invention will appear more fully from the following description of preferred embodiments with reference to the accompanying drawings.

DESCRIPTION OF PREFERRED EMBODIMENTS

Figure 1:
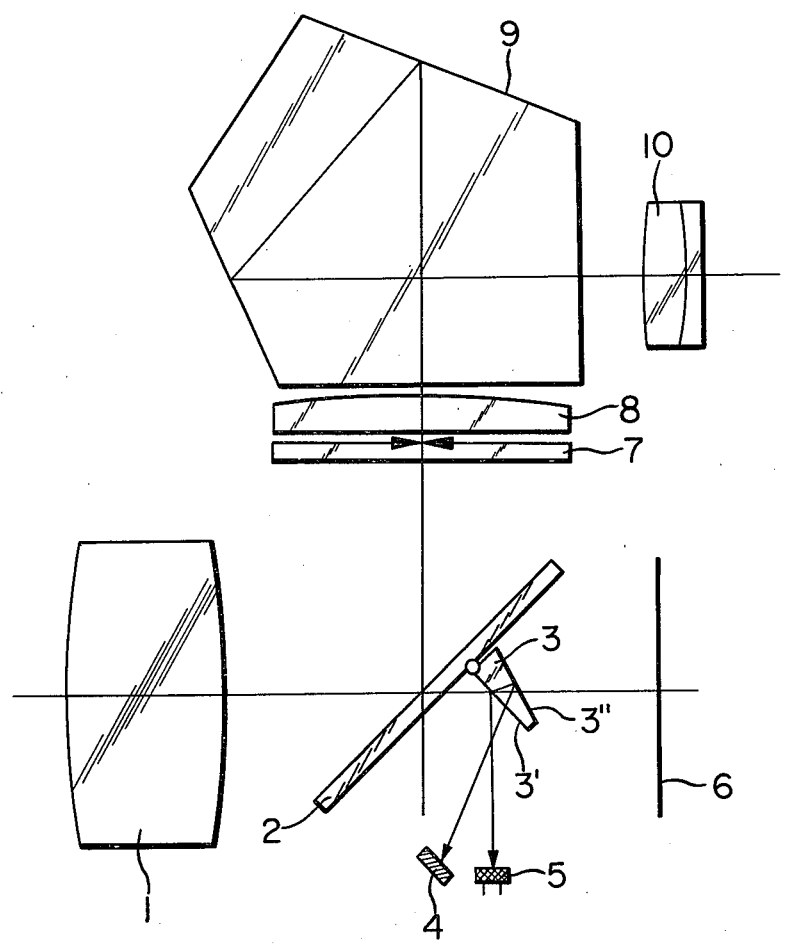
FIG. 1 schematically shows a first embodiment of the invention in the position before exposure.

In FIG. 1 showing a first embodiment of the invention, 1 is a taking lens and 2 is a rotary mirror for view-finder. All or a portion of the mirror surface of the rotary mirror 2 is formed as half-mirror surface. 3 is a sub-mirror for splitting beam. The sub-mirror has a half-mirror surface 3' on the object side and a total-reflecting surface 3" on the film side. The half-mirror surface 3' and the total-reflecting surface 3" are differently inclined with respect to the optical axis. 4 and 5 are photosensitive elements which are independent of each other. The photosensitive element 4 is used to measure the brightness of the object and the photosensitive element 5 is used to measure the object distance or the state of focus. The photosensitive element 5 may be, for example, CCD. 6 is a film plane with which the elements 4 and 5 are conjugate. 7 is a focus plate, 8 is a condenser lens, 9 is a penta-Dachprism and 10 is an eyepiece.

The beam of light coming from the object passes through the taking lens 1 and then it is incident upon the rotary mirror for view-finder 2. The incident beam is divided into two beams by the rotary mirror 2. One of the divided beams is reflected toward the focus plate 7 and is used for observation of picture view field. The other beam transmitted through the rotary mirror 2 is incident upon the beam splitting sub-mirror 3. A portion of the beam incident on the sub-mirror is reflected by its half-mirror surface 3' on the object side and is directed to the photosensitive element 5. The remaining portion of the incident beam is reflected by the total-reflecting surface 3" of the sub-mirror 3 on the film plane side and then passes through the half-mirror surface 3' toward the photosensitive element 4.

In this manner, the beam transmitted through the rotary mirror for view-finder 2 is amplitude-divided into two beams one of which is directed to the photosensitive element 4 and the other beam is to the photosensitive element 5. Therefore, with the arrangement of this embodiment, two or more different purposes such as TTL metering and TTL automatic focusing can be attained at the same tine by using one of the photo sensors 4 and 5 for light measuring and the other for automatic focusing.

Figure 2:
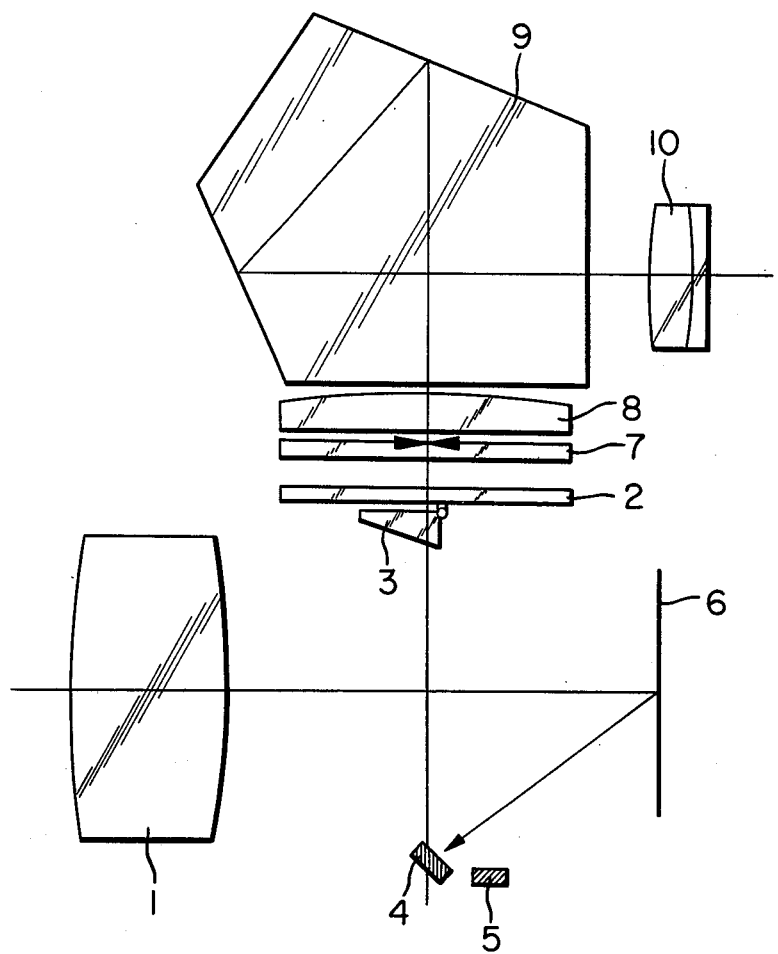
FIG. 2 shows the same embodiment in the position at exposure.

FIG. 2 shows the above embodiment in the position during a picture-taking. In this position, the rotary mirror for view-finder 2 and the beam splitting sub-mirror 3 are in their retracted positions turned up from the positions shown in FIG. 1.

During picture-taking, the film plane 6 is being exposed to light. The film plane reflects the exposure light to some extent. Therefore, the photosensitive element 4 or 5 can receive and measure the reflected exposure light. In case of the shown embodiment, it is preferred to use the photosensitive element 4 for this purpose. The reason for this is that by the action of the sub-mirror 3 the photo reception surface of the element 4 is directed to the film plane and therefore the element 4 is in the position to measure effectively the reflected light from the film plane 6.

Figure 3A:
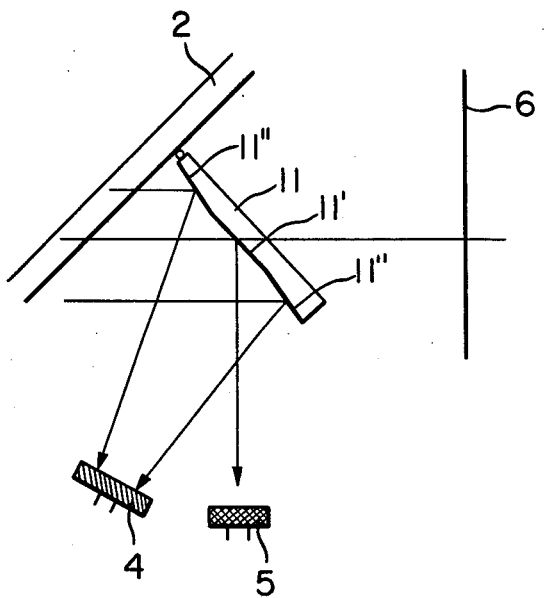
FIGS. 3A and B schematically show a second embodiment of the invention.

FIG. 3A schematically shows an essential portion of a second embodiment of the invention.

In this second embodiment, there is used a wave front division type of beam splitting mirror 11 in place of the amplitude division type beam splitting sub-mirror 3 used in the first embodiment. All of the surfaces of the beam splitting sub-mirror 11 used in the second embodiment are reflecting surfaces.

Figure 3B:
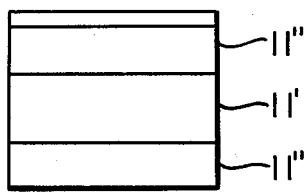

As seen from FIG. 3A and better from FIG. 3B, the sub-mirror 11 has reflecting surfaces 11' and 11" which are different from each other in inclination relative to the optical axis. Therefore, the object beam passed through the rotary mirror for view-finder 2 are reflected in different directions by these reflecting surfaces 11' and 11". Some of the reflected beams are incident on the photosensitive element 4 and some are on the photosensitive element 5. Therefore, like the first embodiment, these beams received by the elements 4 and 5 can be used for different purposes such as TTL metering and TTL automatic focusing at the same time. During picture-taking, the rotary mirror for view-finder 2 together with the sub-mirror 11 is in the retracted position turned up from the starting position, which is the same as the first embodiment. Therefore, the photosensitive element 4 or 5 can be used to directly receive the reflected light from the film plane 6 and measure the reflected exposure light.

FIG. 3B is a view of the beam splitting sub-mirror 11 looking in the direction from the rotary main-mirror 2. This view clearly shows the different inclinations of different reflecting surfaces on the beam splitting sub-mirror 11. It is obvious that the number of splitted beams by the sub-mirror 11 can be increased by increasing the number of reflecting surfaces having different inclination angles relative to the optical axis.

For the purpose of simple illustration, the first and second embodiments have been shown to include such beam splitting member which divides the beam transmitted through the main rotary mirror into two beams. However, it is to be understood that the present invention is never limited to such embodiments only. In the light of above teachings, it is also possible to use such a beam splitting member which divides the incident beam into three or more beams according to the purposes for which such divided beams are intended to use. Furthermore, within the scope of the invention, the light transmission factor of the rotary mirror for view-finder 2 may be changed as desired thereby controlling the quantity of light incident on the beam splitting member.

As readily understood from the foregoing, the light receiving apparatus according to the present invention has an important advantage over the prior art apparatus. According to the invention, a plural member of beams divided in different directions and useful for different purposes can be obtained in a simple manner by providing such a beam splitting member behind the rotary mirror for view-finder which is able to divide a beam of light in two or more different directions.

What I claim is:

1. A single lens reflex camera, comprising:
   a picture-taking optical system for forming an image of an object on an image forming plane;
   first means for directing the light transmitted through said picture-taking optical system to a view-finder optical system, said first means being movable between a first position for reflecting the light from said picture-taking optical system to said view-finder optical system and a second position for directing the light from said picture-taking optical system to the image forming plane, said first means having a semi-transmitting area formed in at least a portion thereof for passing therethrough at least a portion of the light from said picture-taking optical system; and
   second means for reflecting the light transmitted through said semi-transmitting area of said first means in a direction other than the direction towards the image forming plane when said first means is in said first position, said second means having a plurality of reflecting surfaces each at a different angle of inclination for splitting the light from said semi-transmitting area of said first means, said second means being adapted to move, upon movement of said first means to said second position, to a position whereat it does not reflect the light directed to the image forming plane.

2. A single lens reflex camera according to claim 1, wherein said reflecting surfaces of said second means include a semi-transmitting surface and a total-reflection surface, said total-reflection surface being arranged to reflect the light transmitted through said semi-transmitting surface.

3. A single lens reflex camera according to claim 2, further comprising plural photosensitive means for receiving the light split by said second means, one of said photosensitive means being adapted to provide focus information of the camera and another photosensitive means being adapted to provide exposure information of the camera.

* * * * *